(12) United States Patent
Joshi

(10) Patent No.: US 8,986,536 B2
(45) Date of Patent: Mar. 24, 2015

(54) METHOD AND APPARATUS FOR PROCESSING OF SPENT LUBRICATING OIL

(76) Inventor: Rohit Joshi, Pune (IN)

( * ) Notice: Subject to any disclaimer, the term of this patent is extended or adjusted under 35 U.S.C. 154(b) by 7 days.

(21) Appl. No.: 13/389,033

(22) PCT Filed: Nov. 8, 2010

(86) PCT No.: PCT/IN2010/000729
§ 371 (c)(1),
(2), (4) Date: Feb. 14, 2012

(87) PCT Pub. No.: WO2011/055390
PCT Pub. Date: May 12, 2011

(65) Prior Publication Data
US 2012/0205289 A1 Aug. 16, 2012

(30) Foreign Application Priority Data

Nov. 9, 2009 (IN) .......................... 2580/MUM/2009

(51) Int. Cl.
| | | |
|---|---|---|
| *C10M 175/00* | (2006.01) | |
| *B01D 1/06* | (2006.01) | |
| *C10M 175/02* | (2006.01) | |
| *B01D 3/14* | (2006.01) | |

(52) U.S. Cl.
CPC ......... *B01D 1/065* (2013.01); *C10M 175/0033* (2013.01); *C10M 175/0075* (2013.01); *C10M 175/02* (2013.01); *B01D 3/143* (2013.01)
USPC ........... 208/184; 208/179; 208/352; 208/354; 208/355; 208/361; 208/366; 196/102; 196/114

(58) Field of Classification Search
USPC ......... 208/179, 184, 352, 354–355, 361, 366; 196/102, 114
See application file for complete search history.

(56) References Cited

U.S. PATENT DOCUMENTS

| | | | | |
|---|---|---|---|---|
| 2,428,768 | A * | 10/1947 | Bertram | 122/459 |
| 3,923,644 | A * | 12/1975 | Hindman | 208/186 |
| 4,040,898 | A * | 8/1977 | Englander et al. | 159/27.1 |
| 2006/0112692 | A1 * | 6/2006 | Sundel | 60/670 |

OTHER PUBLICATIONS

Trambouze, P. (2000). Petroleum Refining, vol. 4: Materials and Equipment, Editions Technip, 319-320.*

* cited by examiner

*Primary Examiner* — Brian McCaig
(74) *Attorney, Agent, or Firm* — Bryan Cave LLP

(57) ABSTRACT

The present invention provides a method and an apparatus for recovery of spent lubricating oil. The evaporation of hydrocarbon fractions from spent lubricating oil is carried out in three steps. The first step is at approximately 150-1030 mbar and between 70-240° C. in which is greater than 99% water, greater than 99% of ethylene glycol and greater than 50% of hydrocarbon molecules with normal boiling point up to 310° C. are evaporated from spent oil. The second step is operated at 6-30 mbar and 200-2900 C in which predominantly gasoil and light vacuum gasoil fractions are evaporated. The third step is operated at 250-320° C. and 0.5-15 mbar in which mainly heavy vacuum gasoil (boiling range of 425 to 570° C. on ASTM D-1160 test) is evaporated from spent oil.

24 Claims, 4 Drawing Sheets

METHOD AND APPARATUS FOR PROCESSING OF SPENT LUBRICATING OIL

FIELD OF INVENTION

The present invention relates to a method, and an apparatus, capable of separating water, coolants, solvents, and hydrocarbons of normal boiling range similar to gasoil and vacuum gasoil from spent lubricating oil.

BACKGROUND OF THE INVENTION

Spent lubricating oils are lubricants discarded after use from engines such as automobiles, ships and industrial applications such as mining, hydraulic engines. New lubricants contain base stock and additives for enhancing the performance of the base stock in an engine. Base stocks are generally oils of the vacuum gasoil boiling range from paraffinic or naphthenic petroleum crude oils. Alternately, the base stock could be synthetically produced such as polyalfaolefins. The additives are typically organ metallic compounds containing Mg, Ca, Zn, P, S, and Si with molecular weights in few 100 s to a few 1000 s.

Commercial recycling of spent lubrication oil involves of varying degrees of processing, starting with simple filtration of solids to evaporation of water to more elaborate processing that involves separation of base stock (vacuum gasoil like hydrocarbons) from everything else that is present in spent lubricants. Distillation—use of heat and pressure (vacuum)—is the dominant commercial method of recovering base stock (vacuum gasoil) from spent lubricants.

Generally, separation by distillation/evaporation of water, light hydrocarbons, solvents, coolants, fuel, and lubricating oil base stock (LOBS) from spent lubricating oil is achieved in multiple steps.

The distillation of water, light hydrocarbons, fuel, and solvents is carried out in conventional apparatus. This conventional apparatus is either a shell and tube heat exchanger or a furnace (fired heater) for heating the spent oil to the distillation temperature.

Commercially, the separation or recovery of LOBS from discarded lubricants is predominantly carried out by use of a wiped-film (WFE) or a thin-film evaporator with an agitating rotor (ATFE) in one or two steps (in series). These TFE or WFE equipment, are described in detail, as are their principles of operation and typical operating conditions, in "Recent Technology Development in Evaporative Recycling of Discarded Oil" by J. Bishop and D. Arlidge and in "Thin-film Distillation as a Tool in Recycling of Discarded Oil" by J. F. Pauley, both articles appearing in Third International Conference on Discarded Oil Recovery and Reuse, 1978. See also U.S. Pat. No. 4,073,719, U.S. Pat. No. 3,348,600 and U.S. Pat. No. 4,160,692 incorporated herein by reference.

In comparison to standard shell and tube heat exchangers, the WFE and ATFE are expensive to purchase and install, more complicated to operate and maintain (clean, repair). There is also a size limitation (<50 m² heat transfer area) and units larger than 10 m² area are bulky. It would be advantageous to either eliminate or reduce the scope and size of WFE/ATFE distillation in processing of spent lubricating oil.

PRIOR ART

The Exxon patent (U.S. Pat. No. 4,512,878) describes a first process step for distillation of water and fuel and a second process step for lube oil distillation. The first step is achieved by conventional means although TFE or WFE could also be used and the second distillation step, at deeper vacuum and higher temperature, is for lube oil evaporation with the use of a ATFE or WFE. Note that U.S. Pat. No. 4,512,878 describes a single step for lube oil evaporation and it is by the use of a TFE or WFE.

The MRD patent (U.S. Pat. No. 6,712,954) describes a method for reprocessing discarded oils and producing high-grade base oils. In the first step, water and low-boiling organic fractions are removed at 600 mbar and 140-150° C. In second step, fuel oil and diesel fractions (with boiling range of 170-385° C.) are removed. Example-1 suggests this is carried out at 60 mbar and 260° C. The third step is vacuum distillation carried out in a thin-film evaporator. According to an example, the conditions in the thin film evaporator are 3 mbar and heating medium temperature of 384° C. If necessary, an additional step (fourth) of vacuum distillation may be implemented for recovery of high-boiling lube oil fraction. In brief, there are either 1 or 2 steps of lube oil distillation both which are at pressure at or below 5 mbar and, importantly, using a TFE. We believe the first lube oil distillation pressure is too low creating high vapour volumes which can be avoided.

KTI in U.S. Pat. No. 4,941,967 describes three steps of separation. The first step is for removal of water and sludge forming impurities, the second is a pre-distillation at reduced pressure (220 C and 20 mbar) with a short residence time of the oil in the distillation column using a forced-circulation reboiler and the third is a film evaporation under vacuum; the liquid film being maintained in turbulent motion by wiping—so a wiped-film evaporator. The U.S. Pat. No. 4,941,967 describes either one or two thin-film evaporators. The important thing is that again there is a preferred single step of vacuum distillation with possibly second step but both using TFE/WFE. The temperatures of the two TFEs used in series are 320° C. and 345° C. These temperatures are too high for stability of lubricating oil.

Fletcher et al in U.S. Pat. No. 4,342,645 describe four stages of evaporation. Water, gasoline, and volatile components are removed in the first stage. The first stage is operated at near atmospheric pressure. The second stage removes the fuel oil cut. It is operated at 20-150 mm Hg and residual lube oil exit temperature of 460-500° F. The first two stages can be combined. An evaporator is used for each of the first two stages. However, the mechanical construction details are not provided. In this patent, two specific steps of lube oil evaporation are disclosed. Evaporation of the light lube oil cut is at 2-5 mm Hg (abs), 265-500 F (Claim 14 and 16-b) and heavy lube oil fraction at 0.5-3.0 mm Hg abs, 315-600° F. (Claim 15 and 16-c respectively). WFE or TFE are used for the two lube oil evaporation steps. The pressure of light lube oil evaporation step is too low causing large vapour flow and the temperature range is too wide.

Kim in U.S. Pat. No. 4,101,414 describes a process which has two main steps of distillation—pre-distillation and vacuum distillation. The two distillation steps are carried out in the range of 480-650° F. The pre-distillation is carried out at atmospheric temperature and vacuum distillation at 0.1-2.0 mm Hg (abs). Pre-distillation also involves steam stripping for 4 hours. Heat is supplied to the pre-distillation step using a furnace (fired heater) and to the vacuum distillation step using a wiped-film evaporator (WFE). Pre-distillation is preceded by settling and heating to 100-200° F. for de-volatilization. In essence, there is only one step of distillation of lube oil and it is carried out by the use of the WFE.

Alternate to WFE and TFE, distillation of lube oil base stock has been carried out in cyclonic towers with a reboiler—either a forced circulation heat exchanger or furnace style heater (Refer U.S. Pat. No. RE 38366, WO-91/

17804, U.S. Pat. No. 5,814,207). The oil is heated under pressure and then flashed into the distillation tower. In this type of operation, the oil must be heated well beyond the distillation temperature. The distillation temperature is generally 290-320° C. but the oil must be heated to 340-360° C. in the reboiler. This temperature is too high for the stability of lubricating oil. The processes employing distillation towers with reboiler have higher frequent shutdowns for cleaning because of higher rates of fouling. There also appears to be a problem of entrainment of spent additives and sludge into LOBS vapors in the distillation tower resulting in a dark LOBS distillate product with metals content greater then 100 ppm.

In U.S. Pat. No. 5,814,207, Kenton et al describe four stages of evaporation using cyclonic distillation for processing discarded lubricating oil. In the first two steps, water, light hydrocarbons, and fuel oil are removed by use of cyclonic evaporators. The third evaporator operates at 290-330° C. and 15-25 mbar. Two base oil fractions are fractionated from the third stage. Partial condensers are used. The fourth stage is operated at 320-345° C. and at 5-15 mbar. In essence, there are two steps of distillation of lube oil base stock. However, the conditions are too hot, and pressures not low enough. The lube oil is likely to break-down at these temperatures. Forced-circulation heat exchangers are used.

The disadvantages mentioned in the background and the prior art—the use of either bulky, expensive evaporators with rotors or the use of fouling-prone cyclonic evaporators with forced circulation reboilers with poor product quality—are overcome by the present invention.

OBJECTS OF THE INVENTION

Object of the present invention is to provide a method and apparatus for processing of spent lubricating oil and the like.

Another object of the present invention is to provide a method and apparatus capable of recovery of lubricating oil base stock from spent lubricants with highest degree of purity.

Yet another object of the present invention is to provide a method and apparatus for recovery of spent lubricating oil, which is economical in operation and construction.

Further object of the present invention is to provide a method and apparatus for recovery of spent lubricating oil, which has higher operational efficiency.

Further object of the present invention is to provide a method and apparatus for recovery of spent lubricating oil, which is easy to operate.

STATEMENT OF THE INVENTION

According to the present invention there is provided an apparatus for recovery of spent lubricating oil, the apparatus comprising:
  a first evaporator capable of heating the spent lubricating oil to a temperature ranging between 70 to 240° C. to form vapours of hydrocarbons, water, and ethylene glycol from the spent lubricating oil,
  wherein the first evaporator having a first condenser for receiving and condensing the vapors, a first separator separating the condensed liquid from uncondensed vapors from the first condenser, and a first compressor for compressing the uncondensed vapours from the first separator to ambient or above ambient pressure;
  a first bottom pump connected to the first evaporator for pumping the spent lubricating oil therethrough,
  wherein a portion of the spent lubricating oil pumped by the first bottom pump is recirculated through the first evaporator;
  a second evaporator with heat transfer tubes arranged vertically operated at a pressure ranging between 6 to 30 mbars as measured at the heat transfer surface, capable of heating the spent lubricating oil from the first bottom pump at a temperature ranging between 70° to 240° C. to a temperature between 200° C. and 290° C. by distributing the oil to form a flowing film passing over a surface of the heat transfer tubes having a heating media at a temperature of 230° to 380° C. on other surface, so as to form vapours of predominantly gasoil and light vacuum fractions gasoil from the spent lubricating oil at surface of heat transfer tubes;
  wherein the second evaporator having a second condenser for receiving and condensing the vapors, a second separator separating the condensed liquid from uncondensed vapors from the second condenser, and a second compressor for compressing the uncondensed vapours from the second separator to ambient or above ambient pressure;
  a second bottoms pump connected to the second evaporator for pumping the spent lubricating oil therethrough,
  wherein a portion of the spent lubricating oil pumped by the second bottom pump is recirculated through the second evaporator;
  a third evaporator with heat transfer tubes arranged vertically, operated at a pressure ranging between 0.5 to 15 mbar and capable of heating the spent lubricating oil from the second bottom pump at a temperature between 200 to 290° C. to 250° C. to 320° C. by distributing the oil to each of the multiple heat transfer tubes to form a flowing film over a surface of each of the heat exchanger tubes having a heating media at a temperature of 300 to 380° C. circulating on other surface of the heat transfer tubes, thereby forming vapours of predominantly heavy gasoil from the spent lubricating oil at the evaporator's tubes' surface;
  wherein the third evaporator having a third condenser for receiving and condensing the vapors, a third separator separating the condensed liquid from uncondensed vapors from the third condenser, and a third compressor for compressing the uncondensed vapours from the third separator to ambient or above ambient pressure; and
  a third bottoms pump connected to the third evaporator for pumping the spent lubricating oil therethrough,
  wherein the portion of the spent lubricating oil pumped by the third bottom pump is recirculated through the third evaporator and the remaining portion is the recovered spent lubricating oil.

Further, the present invention also includes a method for recovery of spent lubricating oil, the method comprising steps of:
  passing the spent lubricating oil having a temperature ranging between 25 to 30° C. and a pressure ranging between 150 to 1030 mbar through a first evaporator having a heat exchanger with a heating media at a temperature ranging between 230 to 380° C. for heating the spent lubricating oil at a temperature ranging between 70 to 240° C., thereby forming vapours of light hydrocarbon, water, and ethylene glycol form the spent lubricating oil at the heat exchange surface;
  condensing vapours received from the first evaporator in a first condenser;
  separating vapours and liquid from the vapours received from the first condenser in a first separator;

compressing the vapours from the first separator in a first compressor;

passing the spent lubricating oil pumped from the first evaporator having a temperature ranging between 70 to 240° C. through a second evaporator at a pressure ranging between 6 to 30 mbars and having a heat exchanger with a heating media at a temperature ranging between 230 to 380° C. for heating the spent lubricating oil at a temperature ranging between 200 to 290° C., thereby forming vapours of light vacuum gasoil from the spent lubricating oil at the heat exchange surface;

condensing the vapours received from the second evaporator in a second condenser;

separating vapours and liquid from the condensed vapours received from the second condenser in a second separator;

compressing the vapours received from the second separator in a second compressor;

passing the spent lubricating oil pumped from the second evaporator having a temperature ranging between 200 to 290° C. through a third evaporator at a pressure ranging between 0.5 to 15 mbar having a heat exchanger with a heating media at a temperature ranging between 300 to 380° C. for heating the spent lubricating oil to a temperature ranging between 250 to 320° C., thereby forming vapours of vaporising heavy gasoil from the spent lubricating oil;

condensing the vapours received from the third evaporator in a third condenser;

separating vapours and liquid from the condensed vapours received from the third condenser in a third separator;

compressing the vapours received from the third separator in the third compressor, thereby recovering the spent lubricating oil.

DESCRIPTION OF THE INVENTION

Figure 1:
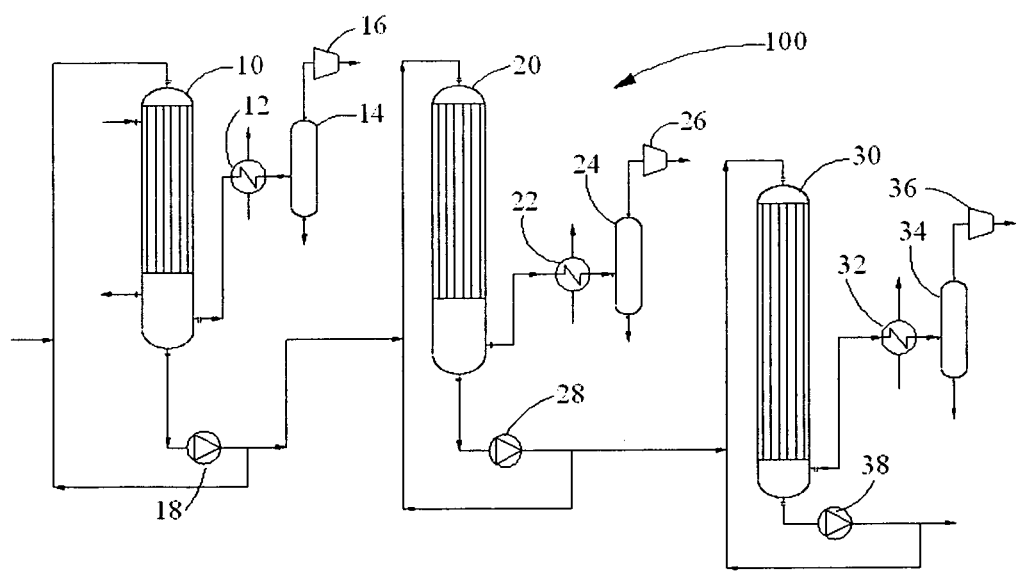
FIG. 1 shows a schematic diagram of an apparatus for recovery of spent lubricating oil in accordance with the present invention.

The foregoing objects of the present invention are accomplished and the problems and shortcomings associated with the prior art, techniques and approaches are overcome by the present invention as described below in the preferred embodiment.

The present invention provides a method and an apparatus for recovery of spent lubricating oil. Further, evaporation of hydrocarbon fraction from spent lubricating oil is carried out in three steps. The first step is at approximately 150-1030 mbar and between 70-240° C. in which is greater then 99% water, greater then 99% of ethylene glycol and greater than 50% of hydrocarbon molecules with normal boiling point up to 310° C. are evaporated from spent oil. The second step is operated at 6-30 mbar and 200-290° C. in which predominantly gasoil and light vacuum gasoil fractions having boiling temperature of approximately 405° C. to 490° C. are evaporated. The third step is operated at 250-320° C. and −0.5-15 mbar in which predominantly heavy vacuum gasoil having boiling temperature of about 425° C. to 570° C. on ASTM D-1160 test is evaporated from spent oil.

The three evaporation steps are carried out in one, two or three specially designed long-tube vertical evaporators and related apparatus, such as condenser, receiver, and the like.

The long-tube is a hollow tube with length to diameter ratios in excess of 10. The LTV heat exchanger includes one or more hollow tubes arranged vertically inside a hollow shell. Each of the hollow tubes is surrounded by heating medium, such as steam, heat transfer fluid, or hot flue gas. The heating medium flows in and out of the shell of the LTV heat exchanger shell.

The spent lubricating oil is distributed inside each of the hollow tubes and is allowed to flow downward through an inner hollow space of the hollow tube under gravitational force. Upon passing the spent lubricating oil through the hollow tubes, hydrocarbons and other compounds within target boiling ranges are vaporized inside the hollow tube. Specifically, the spent lubricating oil flows by forming a thin liquid film on an inner surface of the hollow tube. The generated vapors flow through the center of the tube. Use of vertical heat transfer surfaces reduces accumulation of solid deposits on heat transfer surface, resulting in longer periods between need for cleaning and ease of cleaning. The vapour-liquid mixture exits from the inner hollow space of the hollow tubes and is collected in a receiver chamber. The liquid and the vapors are separated by selecting a proper design and shape for the receiver. The vapors consisting of the hydrocarbons and other compounds within target boiling ranges are removed from the shell and condensed or rectified in a distillation column of the same description below.

In an alternate configuration of the LTV Heat Exchanger, the heating medium flows inside the tubes and the lubricating oil flows down on the outside surface of the tubes. In this configuration of the LTV Heat Exchanger, each tube is designed as a bayonet. here are two tubes—one inside another. The heat transfer medium flows up in the annular area between the two tubes and then down on the inside of the inner tube. This type of tube-inside-tube arrangement allows the heating medium to enter and leave the heat exchanger from the bottom side of the shell and the lubricating oil can be distributed on the top of the bayonet tubes in even manner. This arrangement also allows counter-current heat transfer between the lubricating oil and the heating medium. Hydrocarbon fractions of target temperature range evaporate from the external surface of the tubes. They are removed from the shell and condensed or rectified in a distillation column of the same description below.

This present invention is illustrated with reference to the accompanying drawings, throughout which reference numbers indicate corresponding parts in the various figures. These reference numbers are shown in brackets in the following description.

Referring now to FIG. 1, shows schematic diagram of an apparatus (100) for heating for recovery of spent lubricating oil in accordance with the present invention. The apparatus (100) includes a first evaporator (10), a first condenser (12), a first separator (14), a first compressor (16), a first bottom pump (18), a second evaporator (20), a second condenser (22), a second separator (24), a second compressor (26), a second bottom pump (28), a second evaporator (30), a third condenser (32), a third separator (34), a third compressor (36), and a third bottom pump (38).

In the preferred embodiment, the first evaporator (10) is a shell and tube heat exchanger with a plurality of heat transfer tubes arranged vertically (long tube vertical heat exchanger). The first evaporator (10) receives the spent lubricating oil at ambient temperature, and is operated at a pressure between 150 to 1030 mbar as measured inside the heat transfer tubes. Inside the first evaporator (10), the spent lubricating oil is distributed to each of the plurality of heat transfer tubes, so as to form a flowing film over the inside surface of the heat transfer tubes. The heating media flows around a surface of the heat transfer tubes. The heating media is at a temperature in the range of 230 to 380° C., enabling heating of the spent lubricating oil to a temperature between 70 to 240° C., thereby forming vapours of light hydrocarbons, water, and ethylene glycol from the spent lubricating oil on other surface of the heat transfer tubes. More than 50% of hydrocarbons with normal boiling point of 310° C. or less are evaporated in the first evaporator (10). The vapours from the first evaporator (10) are supplied to the first condenser (12) through pipes and hoses.

The first condenser (12) is capable of condensing the vapours from the first evaporators (10). The condensed liquid and uncondensed vapours are supplied to the first separator (14) through pipes and hoses. The first separator (14) separates vapour and liquid received from the first condenser (12). The uncondensed vapours are supplied to the first compressor (16). In an embodiment, the first separator (14) includes a pump for extracting the condensed liquid therefrom. The first compressor (16) is connected to the first separator (14) through pipe or hoses. The first compressor (16) is capable of compressing the vapours to a pressure just above ambient, so that they can be disposed properly to pollution abatement equipment.

Further, the remaining spent lubricating oil from the first evaporator (10) is pumped to the second evaporator (20) by the first bottom pump (18) and a portion of the spent lubricating oil pumped by the first bottom pump (18) is also recirculated back to the first evaporator (10).

Referring again to FIG. 1, the second evaporator (20) includes heat transfer tubes arranged vertically. The second evaporator (20) receives the spent lubricating oil pumped by the first bottom pump (18) from the first evaporator (10) at a temperature ranging between 70° to 240° C. and is operated at a pressure ranging 6 to 30 mbar (abs) as measured inside the heat transfer tubes. Inside the second evaporator (20) the spent lubricating oil is distributed over each of the multitude of heat transfer tubes to form a-flowing film on a surface of the heat transfer tubes. The heating media at a temperature of 230° to 380° C. is circulated other surface of the heat transfer tubes of the second evaporator (20), thereby heating the spent lubricating oil to a temperature ranging between 200° to 290° C. to form vapours over the inner surface of the heat transfer tubes of predominantly gasoil having atmospheric boiling point in the range of 310-405° C. and light vacuum gasoil having atmospheric boiling point approximately in the range of 405° C. and 470° C. from the spent lubricating oil. The vapours from the second evaporator (20) are supplied to the second condenser (22) through pipes and hoses.

The second condenser (22) is capable of condensing the vapours received from the second evaporator (20). The condensed liquid and uncondensed vapors are supplied to the second separator (24) through pipes and hoses. The second separator (24) is capable of separating the vapour and liquid thereof. The liquid is removed from a bottom portion of the second separator (24) and the vapours are supplied to the second compressor (26). In an embodiment, the second separator (24) includes a pump for extracting the liquid therefrom. The second compressor (26) is connected to the second separator (24) by pipe or hoses for receiving the uncondensed vapour from the separator (24). The second compressor (26) is capable of compressing the vapors to a pressure just above ambient so that they can be disposed properly to pollution abatement equipment.

Further, the remaining spent lubricating oil from the second evaporator (20) is pumped to the third evaporator (30) by the second bottoms pump (28) and a portion of the spent lubricating oil pumped by the second bottoms pump (28) is also recirculated back through the second evaporator (20).

Referring again to FIG. 1, the third evaporator (30) includes heat transfer tubes arranged vertically. The third evaporator (30) receives the spent lubricating oil from the second evaporator (20) pumped by the second bottom pump (28) at a temperature ranging between 200 to 290° C. is subjected to a pressure ranging between 0.5-15 mbar as measured inside the heat transfer tubes. Inside the third evaporator, the oil is distributed to a multitude of tubes so as to form a flowing film on a surface of each of the tubes of the third evaporator (30). The heat exchanger tubes are heated by circulating a heating media on other surface of heat exchanger tubes at a temperature of 300° C. to 380° C., thereby heating the spent lubricating oil to a temperature ranging between 250° C. to 320° C. and vaporising over surface of the heat transfer tubes predominantly heavy gasoil having atmospheric boiling point in the range of 425° C. and 525° C. from the spent lubricating oil. The vaporised heavy gasoil is supplied to the third condenser (32) through pipes and hoses.

The third condenser (32) is capable of condensing the vapours received from the third evaporator (30). The condensed heavy gasoil and any uncondensed vapors are supplied to the separator (34) through pipes and hoses. The third separator (34) separates vapour and liquid received from the condenser (32). In an embodiment, the third separator (34) includes a pump for extracting the liquid therefrom. The vapours from third separator (34) are supplied to the third compressor (36). The third compressor (36) is connected to the third separator (34) by pipes or hoses for receiving the uncondensed vapour therefrom. The third compressor (36) is capable of compressing the vapours fed to it to a pressure just above ambient so they can be disposed properly to pollution abatement equipment.

Further, the remaining spent lubricating oil from the third evaporator (30) is pumped out further by the third bottom pump (38) and a portion of the spent lubricating oil pumped by the third bottoms pump (38) is also recirculated back through the third evaporator (30). The net product from the third bottom pump (38) is the residue after evaporation of water, coolants (glycols), solvents, fuel fraction, gasoil and vacuum gasoil from spent lubricating oils. The residue primarily consists of additives in present in the spent lubricant.

In an embodiment, prior to condensation, the vapours from the first evaporator (10), the second evaporator (22) and the third evaporator (30) may be washed over a bed of structured or random packing or by use of entrainment separator devices to remove entrained liquid droplets and condense higher molecular weight molecules (greater then 500) containing Si, P and organ-metallic compounds.

In an embodiment, the first compressor (16), the second compressor (26) and third compressor (36) are vacuum compressor, such as mechanical blower & pump, steam jets, a combination and the like thereof. The vacuum system is designed to exert target vacuum/pressure on the spent lubricating oil processed in the heat exchanger tubes.

In another embodiment, one or more of the first evaporator (10), the second evaporator (20) and the third evaporator (30) is a vertical tube evaporator (VTE) apparatus used as described in greater details herewith. The VTE consists of plurality of long vertical metal tubes are held inside a metal shell with tube-sheets at each end. The shell is closed above and below the two tube-sheets with metal caps or heads. In this manner, the spent lubricating oil enters though one head, flow inside the tubes and exit from the other. The heating media enters the shell, flow on the outer surface of the tubes and exit from the shell. A tortuous path is created for the heating media by use of plurality of baffles. The two fluids do not come in contact with each other. The entire assembly is mounted/held vertically. When the spent lubricating oil flows downward, pan-type distributors drip the liquid on to the tube-sheet distributing the liquid to each of the multiple tubes uniformly.

In the present invention, spent lubricating oil enters the VTE on the tube-side and distributed to the inside of each vertical tube. A heating medium such as steam or heat transfer fluid enters the shell-side and flows on the outside of the vertical tubes. Spent lubricating oil forms a flowing film— either moving upward or downward—on the inner surface of the tubes and is heated by transfer of heat from the heating medium. As temperature of spent oil increases, at the operating pressure, certain compounds present in spent lubricating oil evaporate at the surface of the tube. The vapors either flow in the same direction or opposite direction as the liquid or exit the tubes. The tube diameters, liquid loading and vapour velocities are chosen so as to maintain the liquid film on the tube surface and vapour flows through the central core of the tube void.

Use of vertical heat exchanger in one or more of the first evaporator (10), the second evaporator (20) and the third evaporator (30) reduces accumulation of solid deposits on heat transfer surface, resulting in longer periods between cleaning and also enables cleaning with lesser efforts. Further, the first evaporator (10), the second evaporator (20) and/or the third evaporator (30) are made of material, such as carbon steel or stainless steel. In another embodiment, the first evaporator (10), the second evaporator (20) and/or the third evaporator (30) are made of carbon steel coated with Teflon. In yet another embodiment, the first evaporator (10), the second evaporator (20) and/or the third evaporator (30) are made of carbon steel cladded with stainless steel. The vertical long-tube heat exchanger does not have moving parts. Therefore it is easier to maintain and less bulky as compared to commercially common agitated thin-film (ATFE) or wiped-film (WFE) or short-path wiped-film evaporators (SP-WFE). Further, the vertical long-tube evaporators can have up to 10 times higher heat transfer area as compared to comparable diameter ATFE or WFE or SPWFE.

Further, the spent lubricating oil flow rate per tube is maintained between 50-1000 liter/hour per 1" of diameter of the heat exchanger tube. The number of tubes and the diameter of the tubes are chosen so that the velocity of hydrocarbon vapors when inside the long-tube is maintained less than 50 m/s.

Figure 2:
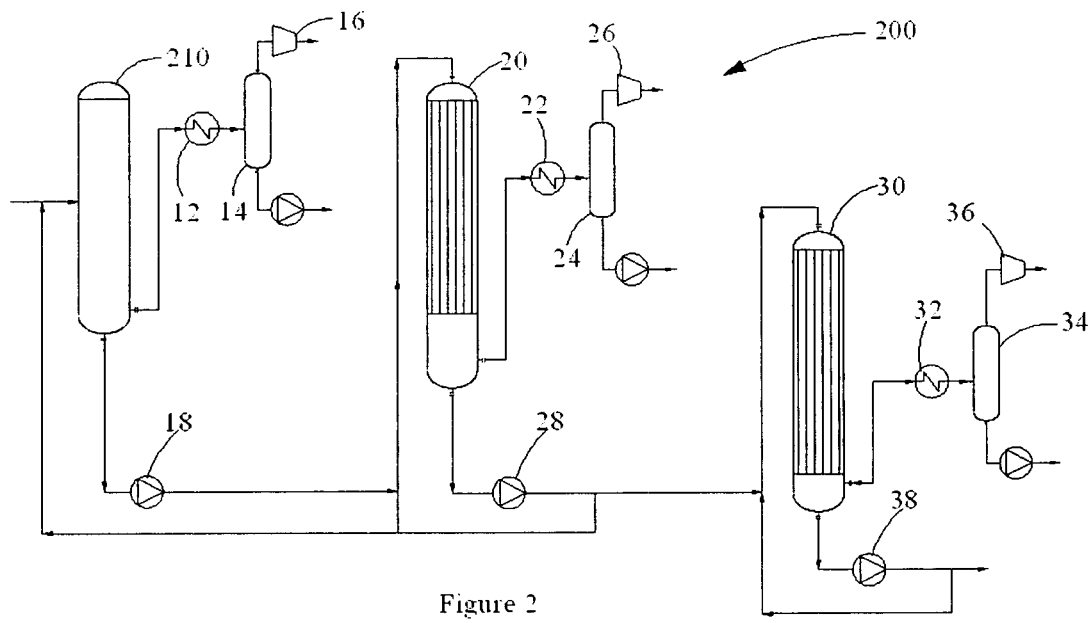
FIG. 2 shows a schematic diagram of an embodiment of the apparatus of FIG. 1.

Referencing now to FIG. 2, shows an embodiment of the apparatus (200) for recovery of spent lubricating oil in accordance with the present invention, in which the first evaporator is a flash evaporator (210) and remaining all the elements are same, such as first condenser (12), a first separator (14), a first compressor (16), a first bottom pump (18), a second evaporator (20), a second condenser (22), a second separator (24), a second compressor (26), a second bottom pump (28), a second evaporator (30), a third condenser (32), a third separator (34), a third compressor (36), and a third bottom pump (38) and are explained above.

The flash evaporator (210) is supplied with the heated spent lubricating oil recirculated from the second evaporator (20). The oil recycled from the second evaporator (20) has a temperature ranging between 200 to 290° C. The quantity of oil recycled is such that the total feed stream entering the flash evaporator (210) is at a temperature ranging between 70 to 240° C. to form vapours of light hydrocarbons normal having boiling point of 310° C. or less, water, and ethylene glycol from the spent lubricating oil.

Figure 3:
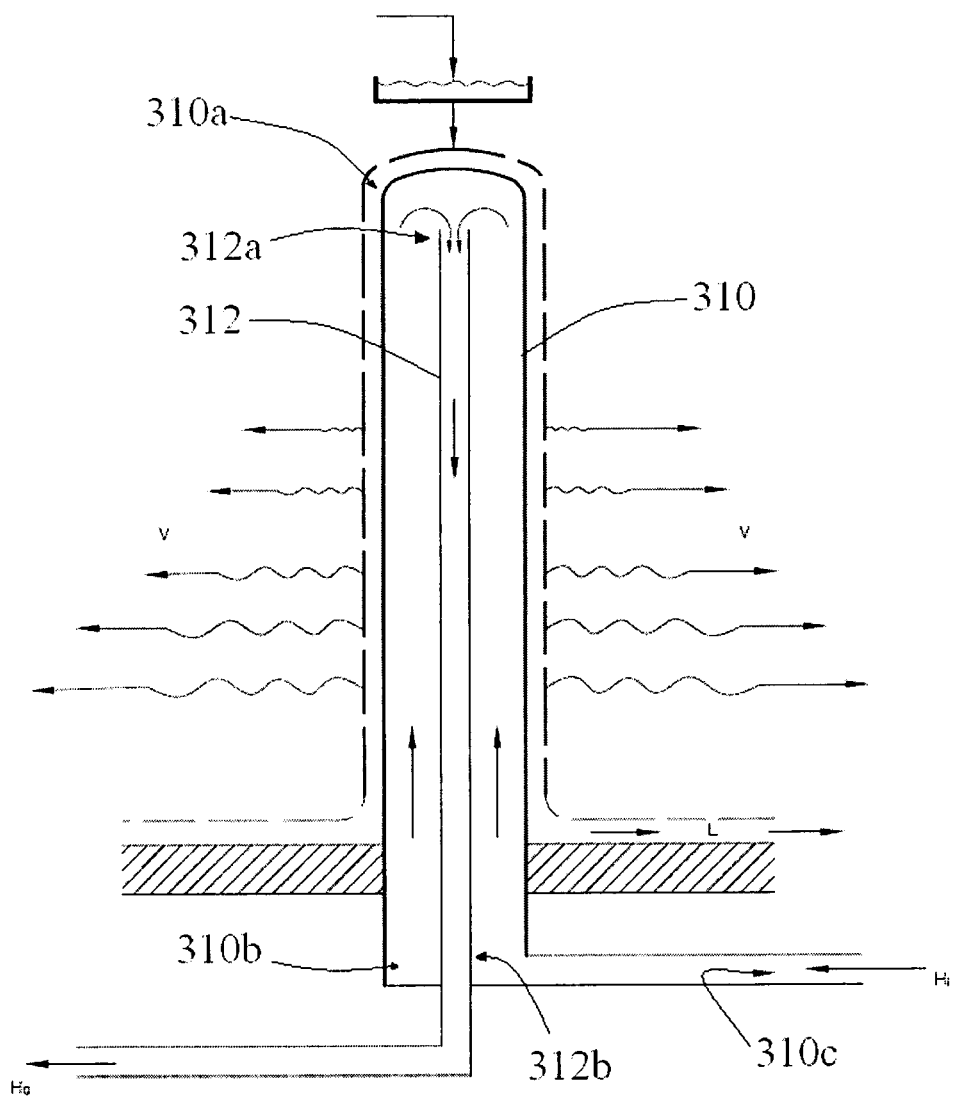
FIG. 3 shows a schematic diagram of a bayonet tube heat exchanger in accordance with the present invention.

In yet another embodiment, one or more of the first evaporator, the second evaporator, and the third evaporator are bayonet tube heat exchangers. The bayonet tube heat exchanger includes a plurality of first hollow tubes and plurality of central tubes, for the purpose of explanation. FIG. 3 shows one first hollow tube (310) and one central tube (312). The first hollow tube (310) includes a closed end (310a) and an open end (310b) vertically enclosed in an enclosure (not shown). The open end (310b) of the first hollow tube (310) is adapted to configure to form a passage (310c). The central tube (312) has a first end portion (312a) and the second end portion (312b), which are both open ends. The central tube (312) is disposed inside of the first hollow tube (310) passing through the second open end (310b) thereof. The heating media passed though the passage (310c) of the first hollow tube (310) for heating the falling film of spent lubricating oil on outer surface of the first hollow tube (310) thereafter the heating media is egressed out through the central tube (312). The diameter of a shell and spacing between the heat transfer tubes increases from first evaporator (10), to the second evaporator (20) and the third evaporator (30). The first evaporator (10), the second evaporator (20) and/or the third evaporator (30) are designed so as to keep the velocity of vapors less than 50 m/s when spent oil flows on the outside surface of the long-tube.

Further, the first condenser (12), the second condenser (22) and the third condenser (32) are surface-contact type condensers, such as 'U-tube' heat exchangers with a cooling media, such as water, cooling the heat transfer surfaces of the condenser. In an embodiment, the first condenser (12), the second condenser (22) and the third condenser (32) are direct-contact type spray condensers.

The present invention also describes a method for recovering spent lubricating oil by using aforesaid apparatus. As mentioned before, the method includes a first, second and third steps followed sequentially. Three LTV Heat Exchangers and their respective condensers and/or distillation columns as described above are used. The three LTV heat exchangers are connected to each other in series by means of tubes, pipes, hoses or the like. Each of the three LTV heat exchangers is custom designed so it is appropriate for the process step where it is employed. Based upon the processing capacity (throughput), the number of tubes, diameter, thickness, pitch, and length of tubes are selected. Also, a decision is made whether a hollow tube heat exchanger or a bayonet heat exchanger is used. Further, appropriate heating medium is selected. The flow of product liquid recycled to the feed section of the LTV heat exchanger is selected. The target conditions of temperature applicable to each step of the process are exerted by controlling the flow and temperature of the heating medium to each of the three LTV Heat Exchangers. The target conditions of pressure (vacuum) applicable to each step of the process are exerted by control of the vacuum pump connected to the condenser of each of the three LTV Heat Exchangers.

In one alternative embodiment of the invention, the first evaporation step is achieved by recycling a portion of the liquid oil product emerging from either the second or third evaporation step. The hot liquid oil product is mixed with cold lubricating oil in such a proportion that the mixture reaches the target temperature of the first step at the target pressure. In this embodiment, two instead of three LTV Heat Exchangers are connected in series.

In another embodiment, one single long-tube heat exchanger is used in a batch mode (block mode). The pressure and temperature conditions are varied in one LTV Heat Exchanger apparatus (as described above) and three or four separate distillate fractions are condensed and received successively. For the purpose of the foregoing batch mode of operation, either hollow tube heat exchanger or a bayonet tube heat exchanger is used. The batch operation reduces the initial (capital) cost of the evaporation plant.

Figure 4:
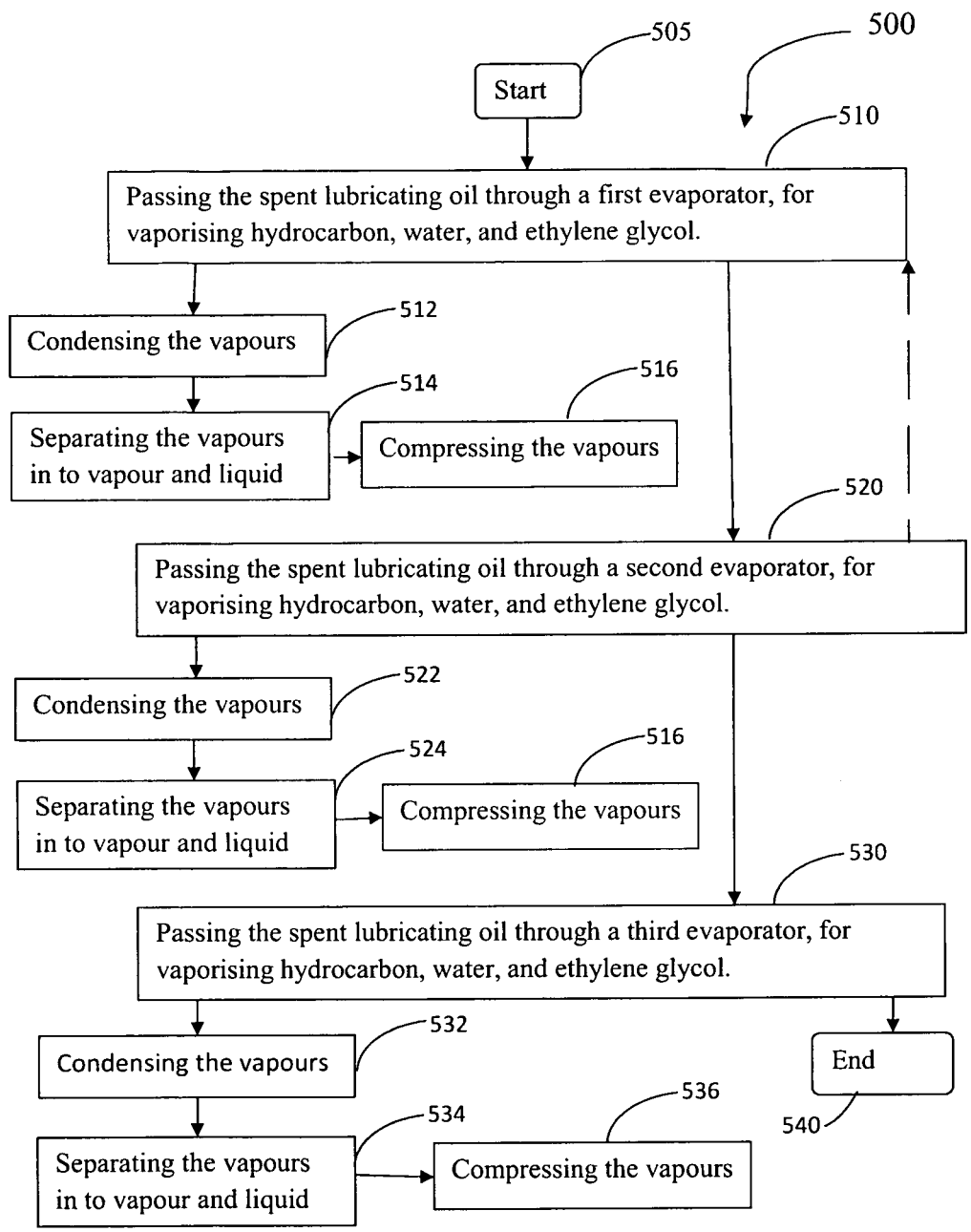
FIG. 4 shows a flow chart of a method for recovery of spent lubricating oil in accordance with the present invention.

Further, the present invention also includes a method (500) for recovery of spent lubricating oil. Referencing now to FIG. 4, shows a flow chart of the method (500) explained in conjunction with the apparatus (100) of FIG. 1. The method (500) starts at step (505), please refer Table 1 for characteristics of typical used spent lubricating oils:

At step (510) the method includes passing the spent lubricating oil at a pressure ranging between 150 to 1030 mbar through the first evaporator (10) with a heating media at a temperature ranging between 230° C. to 380° C. for heating the spent lubricating oil to a temperature ranging between 70° C. to 240° C., thereby forming vapours of light hydrocarbons having atmospheric boiling point 310° C. or less, water, and coolants such as ethylene glycol from the spent lubricating oil.

Further, the vapours received from the first evaporator (10) are condensed in the first condenser (12), at step (512).

Thereafter, the condensed liquid and any uncondensed vapour received from the first condenser (12) are separated from uncondensed vapours in the first separator (14), at step (514). Furthermore, the uncondensed vapours from the first separator (14) are compressed in the first compressor (516).

Further, the spent lubricating oil pumped from the first evaporator (10) having a temperature ranging between 70° C. to 240° C. is passed through the second evaporator (20) at a pressure ranging between 8 to 30 mbars passed and with a heating media at a temperature ranging between 230° C. to 380° C. for heating the spent lubricating oil to a temperature ranging between 200° C. to 290° C., thereby form vapours of gasoil and light vacuum gasoil from the spent lubricating oil, at step (520).

Furthermore, the vapours received from the second evaporator (20) are condensed in the second condenser (22), at step (522). After that, the condensed liquid received from the second condenser is separated from uncondensed vapours in the second separator (24), at step (524).

Thereafter, the uncondensed vapours from the second separator are compressed in the second compressor (26), at step (526). Further, the spent lubricating oil pumped from the second evaporator (20) at a temperature ranging between 200° C. to 290° C. is passed through the third evaporator (30) operated at a pressure ranging between 0.5-15 mbar and with a heating media at a temperature ranging between 300 to 380° C. for heating the spent lubricating oil to a temperature ranging between 250 to 320° C., thereby forming vapours of heavy gasoil, at step (530).

Thereafter, the vapours received from the third evaporator are condensed in the third condenser (32), at step (532). After that, the condensed liquid from the third condenser (32) is separated from uncondensed vapours in the third separator (34), at step (534). Further, the uncondensed vapours from the third separator (34) are compressed in the third compressor (36), thereby recovering the spent lubricating oil, at step (536), and further the method (500) ends at (540).

In an embodiment, the spent lubricating oil heated in the second evaporator (20) is flashed with the spent lubricating oil in the first evaporator (220) for vaporising light hydrocarbons, water, and ethylene glycol therefrom (refer FIG. 2).

The method (500) and the apparatus (100 & 200) of the present invention are capable of recovery of spent lubricating oil with highest degree of purity through careful selection of vapour velocities to limit carryover of liquid containing spent additives and solid particles. Further, the method (500) and the apparatus (100 & 200) for recovery of spent lubricating oil are economical in operation and construction because the heat transfer equipment has no moving parts. Furthermore, the method (500) and the apparatus (100 & 200) for recovery of spent lubricating oil have higher operational efficiencies because of reduced tendency for fouling. Moreover, the method (500) and the apparatus (100 & 200) for recovery of spent lubricating oil are easier to operate.

The foregoing objects of the invention are accomplished and the problems and shortcomings associated with prior art techniques and approaches are overcome by the present invention described in the present embodiment.

Detailed descriptions of the preferred embodiment are provided herein; however, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or matter.

The embodiments of the invention as described above and the methods disclosed herein will suggest further modification and alterations to those skilled in the art. Such further modifications and alterations may be made without departing from the spirit and scope of the invention.

TABLE 1

Characterization of used lubricating oil (dry basis)

| Parameter | Unit | Method | Value (Range) |
|---|---|---|---|
| Viscosity @ 210° F./100° C., | cSt | ASTM D445 | 5.5-10.0 |
| API Gravity, 60° F./15.5° C. | | ASTM D287 | 25-28 |
| Flash Point | ° C. | ASTM D92 | >40 |
| Pour Point | ° C. | ASTM D97 | <0 |
| Total Acid Number | mg KOH/g | ASTM D664 | 0.8-2.0 |
| Sulfur | mg/kg | ASTM D-4294 | 0.3-0.4 |
| Organic Halogens | mg/kg | EPA-9076 | 100-400 |
| Water | mg/kg | ASTM D-1744 | <10% |
| Ash Content | g/100 g | ASTM D482 | 0.4-0.8 |
| Individual Metal, ppm | mg/kg | ICP/EPA 6010 | |
| Ca | mg/kg | | 300-1500 |
| Mg | mg/kg | | 150-500 |
| Zn | mg/kg | | 200-1000 |
| P | mg/kg | | 300-1000 |
| Si | mg/kg | | 10-150 |

I claim:

1. A method for recovery of spent lubricating oil, the method comprising steps of:

passing the spent lubricating oil having ambient temperature and a pressure ranging between 150 to 1030 mbar through a first evaporator having a first heating device for heating the spent lubricating oil to a temperature ranging between 70° C. to 240° C., thereby forming vapours of light hydrocarbons, water, and/or ethylene glycol from the spent lubricating oil;

condensing vapours received from the first evaporator in a first condenser;

separating vapours and liquid from the vapours received from the first condenser in a first separator;

compressing the vapours from the first separator in a first compressor;

passing the spent lubricating oil pumped from the first evaporator having a temperature ranging between 70° C. to 240° C. through a second evaporator at a pressure ranging between 6 to 30 mbar and having a second heating device for heating the spent lubricating oil to a temperature ranging between 200° C. to 290° C., thereby forming vapours of light vacuum gasoil from the spent lubricating oil;

condensing the vapours received from the second evaporator in a second condenser;

separating vapours and liquid from the condensed vapours received from the second condenser in a second separator;

compressing the vapours received from the second separator in a second compressor;

passing the spent lubricating oil pumped from the second evaporator having a temperature ranging between 200° C. to 290° C. through a third evaporator at a pressure ranging between 0.5 to 15 mbar having a third heating device for heating the spent lubricating oil to a temperature ranging between 250° C. to 320° C., thereby forming vapours of heavy gasoil from the spent lubricating oil;

condensing the vapours received from the third evaporator in a third condenser;

separating vapours and liquid from the condensed vapours received from the third condenser in a third separator;

compressing the vapours received from the third separator in the third compressor, thereby recovering the spent lubricating oil;

wherein one or more of the first, second, and third heating devices include heat transfer tubes arranged vertically, whereby oil is distributed to the heat transfer tubes to form a flowing liquid film over a surface of the heat transfer tubes.

2. A method as claimed in claim 1, wherein the spent lubricating oil heated in the second evaporator is mixed and flashed with the spent lubricating oil in the first evaporator for vaporising hydrocarbon, water, and ethylene glycol therefrom.

3. A method for recovery of spent lubricating oil, the method comprising:

a first evaporation step carried out in a first evaporation system, the first evaporation step comprising heating the spent lubricating oil to a temperature ranging between 70° C. to 240° C. to form vapours of light hydrocarbons, water, and/or ethylene glycol from the spent lubricating oil; condensing the vapours; separating condensed liquid from uncondensed vapours; compressing the uncondensed vapours to ambient or above ambient pressure; and pumping at the spent lubricating oil through a first bottoms pump, wherein a portion of the spent lubricating oil pumped by the first bottoms pump is recirculated through the first evaporation system and the net remaining portion is pumped to a second evaporation system; and a second evaporation step carried out in the second evaporation system, the second evaporation step comprising heating the spent lubricating oil from the first bottom pump from a temperature ranging between 70° C. to 240° C. to a temperature ranging between 200° C. and 290° C., so as to form vapours of predominantly hydrocarbons with boiling point ranges of atmospheric gasoil and vacuum gasoil from the spent lubricating oil, at least a portion of said heating being carried out at a pressure ranging between 6 to 30 mbars as measured at the heat transfer surface; condensing the vapours, thereby recovering lubricating oil from the spent lubricating oil; separating the condensed liquid from uncondensed vapours; compressing the uncondensed vapours to ambient or above ambient pressure; and pumping the spent lubricating oil through a second bottoms pump, wherein a portion of the spent lubricating oil pumped by the second bottoms pump is recirculated through the second evaporation system and the net remaining portion is a residue comprising one or more of spent additives, solid particles, and sludge;

wherein one or more of the first and second evaporation systems include an evaporator comprising heat transfer tubes arranged vertically, whereby oil is distributed to the heat transfer tubes to form a flowing liquid film over a surface of the heat transfer tubes, such that evaporation takes place at the heat transfer surface.

4. The method as claimed in claim 3, wherein the first evaporation system comprises a flash evaporator using heated oil at a temperature ranging between 200° C. to 290° C. received from the second evaporation step for heating the spent lubricating oil to a temperature ranging between 70° C. to 240° C. and vaporising predominantly light hydrocarbons, water, and/or ethylene glycol from the spent lubricating oil; and the second evaporation system includes an evaporator comprising heat transfer tubes arranged vertically, whereby oil is distributed to the heat transfer tubes to form a flowing liquid film over a surface of the heat transfer tubes, such that evaporation takes place at the heat transfer surface.

5. The method as claimed in claim 3, wherein the first evaporation system includes an evaporator comprising heat exchanger tubes arranged vertically, wherein the evaporator receives the spent lubricating oil having ambient temperature and a pressure ranging between 150 to 1030 mbars and heats the spent lubricating oil to form a flowing liquid film over a surface of the heat exchanger tubes, such that evaporation takes place at the heat transfer surface, thereby heating the spent lubricating oil to a temperature ranging between 70° C. to 240° C. for vaporising light hydrocarbons, water, and/or ethylene glycol from the spent lubricating oil.

6. The method as claimed in claim 3, wherein one or more of the first and second evaporation systems include vertical tube heat evaporators (VTE), which comprises: a shell; plurality of long vertical metal tubes held inside the shell with tube-sheets at each end whereby oil is distributed to the vertical tubes to form a flowing liquid film over a surface of the tubes, such that evaporation takes place at the heat transfer surface, wherein the shell is closed above and below the two tube-sheets with metal caps or heads; and plurality of baffles disposed in the shell for creating a tortuous path of the heating media around the long vertical metal tubes.

7. The method as claimed in claim 3, wherein one or more of the first and second evaporation systems include a bayonet tube heat exchanger.

8. The method as claimed in claim 7, wherein the bayonet tube heat exchanger comprises:

a plurality of first hollow tubes each having a closed end and open end vertically enclosed in a enclosure, wherein the open end of each first hollow tube is adapted to configure to form a passage; and a plurality of central tubes each having both ends open, a central tube of the plurality of central tubes disposed inside each of the first hollow tube passing through the second open end thereof, wherein the heating media is passed though the passage of the first hollow tube thereby heating the flowing film of spent lubricating oil on outer surface of the first hollow tube and thereafter the heating media is egressed out through the central tube.

9. The method as claimed in claim 3, wherein the vertical tubes are made of steel with or without a coating of Teflon.

10. The method as claimed in claim 3, wherein the vertical tubes are made of carbon steel cladded with stainless steel.

11. The method as claimed in claim 3, wherein condensing in the first and second evaporation steps is carried out via surface-contact 'U-tube' heat exchangers.

12. The method as claimed in claim 3, wherein condensing in the first and second evaporation steps is carried out via direct-contact type spray condensers.

13. The method as claimed in claim 3, wherein the velocity of hydrocarbon vapours in the heat transfer tubes is less than 50 m/s.

14. A method for recovery of spent lubricating oil, the method comprising:
a first evaporation step carried out in a first evaporation system, the first evaporation step comprising heating the spent lubricating oil to a temperature ranging between 70° C. to 240° C. to form vapours of light hydrocarbons, water, and/or ethylene glycol from the spent lubricating oil; condensing the vapours; separating condensed liquid from uncondensed vapours; compressing the uncondensed vapours to ambient or above ambient pressure; and pumping at the spent lubricating oil through a first bottoms pump, wherein a portion of the spent lubricating oil pumped by the first bottoms pump is recirculated through the first evaporation system and the net remaining portion is pumped to a second evaporation system;
a second evaporation step carried out in the second evaporation system, the second evaporation step comprising heating the spent lubricating oil from the first bottom pump from a temperature ranging between 70° C. to 240° C. to a temperature ranging between 200° C. and 290° C., so as to form vapours of predominantly hydrocarbons with boiling point ranges of atmospheric gasoil and vacuum gasoil from the spent lubricating oil, at least a portion of said heating being carried out at a pressure ranging between 6 to 30 mbars as measured at the heat transfer surface; condensing the vapours, thereby recovering lubricating oil from the spent lubricating oil; separating the condensed liquid from uncondensed vapours; compressing the uncondensed vapours to ambient or above ambient pressure; and pumping the spent lubricating oil through a second bottoms pump, wherein a portion of the spent lubricating oil pumped by the second bottoms pump is recirculated through the second evaporation system and the net remaining portion is pumped to a third evaporation system; and
a third evaporation step carried out in a third evaporation system, the third evaporation step comprising heating the spent lubricating oil from the second bottom pump from a temperature ranging between 200° C. to 290° C. to a temperature ranging between 250° C. to 320° C. by a heating media at a temperature of 300° C. to 380° C., so as to form vapours of predominantly heavy vacuum gasoil from the spent lubricating oil, at least a portion of said heating being carried out at a pressure ranging between 0.5 to 15 mbar measured at the heat transfer surface; condensing the vapours, thereby recovering lubricating oil from the spent lubricating oil; separating the condensed liquid from uncondensed vapours; compressing the uncondensed vapours to ambient or above ambient pressure; and pumping the spent lubricating oil through a third bottoms pump, wherein a portion of the spent lubricating oil pumped by the third bottoms pump is recirculated through the third evaporation system and the net remaining portion is a residue comprising one or more of spent additives, solid particles, and sludge;
wherein one or more of the first, second, and third evaporation systems include an evaporator comprising heat transfer tubes arranged vertically, whereby oil is distributed to the heat transfer tubes to form a flowing liquid film over a surface of the heat transfer tubes, such that evaporation takes place at the heat transfer surface.

15. The method as claimed in claim 14, wherein
the first evaporation system comprises a flash evaporator using heated oil at a temperature ranging between 200° C. to 290° C. received from the second evaporation step for heating the spent lubricating oil to a temperature ranging between 70° C. to 240° C. and vaporising predominantly light hydrocarbons, water, and/or ethylene glycol from the spent lubricating oil; and
the second and/or third evaporation system includes an evaporator comprising heat transfer tubes arranged vertically, whereby oil is distributed to the heat transfer tubes to form a flowing liquid film over a surface of the heat transfer tubes, such that evaporation takes place at the heat transfer surface.

16. The method as claimed in claim 14, wherein
the first evaporation system includes an evaporator comprising heat exchanger tubes arranged vertically,
wherein the evaporator receives the spent lubricating oil having a temperature ranging between 25° C. to 35° C. and a pressure ranging between 150 to 1030 mbars and heats the spent lubricating oil to form a flowing liquid film over a surface of the heat exchanger tubes at a temperature in the range of 230° C. to 250° C.,
thereby heating the spent lubricating oil to a temperature ranging between 70° C. to 240° C. for vaporising light hydrocarbons, water, and/or ethylene glycol from the spent lubricating oil.

17. The method as claimed in claim 14, wherein one or more of the first, second, and third evaporation systems include vertical tube heat evaporators (VTE), which comprises: a shell; plurality of long vertical metal tubes held inside the shell with tube-sheets at each end whereby oil is distributed to the vertical tubes to form a flowing liquid film over a surface of the tubes, such that evaporation takes place at the heat transfer surface, wherein the shell is closed above and below the two tube-sheets with metal caps or heads; and plurality of baffles disposed in the shell for creating a tortuous path of the heating media around the long vertical metal tubes.

18. The method as claimed in claim 14, wherein one or more of the first, second, and third evaporation systems include a bayonet tube heat exchanger.

19. The method as claimed in claim 18, wherein the bayonet tube heat exchanger comprises:
a plurality of first hollow tubes each having a closed end and open end vertically enclosed in a enclosure, wherein the open end of each first hollow tube is adapted to configure to form a passage; and
a plurality of central tubes each having both ends open, a central tube of the plurality of central tubes disposed inside each of the first hollow tube passing through the second open end thereof, wherein the heating media is passed though the passage of the first hollow tube thereby heating the flowing film of spent lubricating oil on outer surface of the first hollow tube and thereafter the heating media is egressed out through the central tube.

20. The method as claimed in claim 14, wherein the vertical tubes are made of steel with or without a coating of Teflon.

21. The method as claimed in claim 14, wherein the vertical tubes are made of carbon steel cladded with stainless steel.

22. The method as claimed in claim 14, wherein condensing in the first and second evaporation steps is carried out via surface-contact 'U-tube' heat exchangers.

23. The method as claimed in claim 14, wherein condensing in the first and second evaporation steps is carried out via direct-contact type spray condensers.

24. The method as claimed in claim 14, wherein the velocity of hydrocarbon vapours in the heat transfer tubes is less than 50 m/s.

* * * * *